United States Patent Office 3,830,866
Patented Aug. 20, 1974

---

3,830,866
PROCESS FOR THE CATALYTIC CONVERSION OF OLEFINS TO AROMATICS
Alfred F. D'Alessandro, Havertown, and Maurice M. Mitchell, Jr., Wallingford, Pa., assignors to Atlantic Richfield Company, New York, N.Y.
No Drawing. Continuation of abandoned application Ser. No. 84,453, Oct. 27, 1970. This application May 31, 1973, Ser. No. 365,804
Int. Cl. C07c 3/02
U.S. Cl. 260—673          2 Claims

ABSTRACT OF THE DISCLOSURE

Olefins having an allyl hydrogen are converted to aromatics by contacting them with an intimate mixture of a dehydrodimerization agent and an aromatization catalyst at a temperature of from 400° C. to 650° C. The dehydrodimerization agent is an oxide of bismuth, lead or antimony, and the aromatization catalyst is a metal such as supported platinum, palladium or cobalt, or metal oxide such as chromia-alumina, cobalt molybdate, magnesia, tin oxide or zinc oxide. The advantage for the process is high selectivity for the specific aromatic or aromatics obtainable from each olefin, for example paraxylene from isobutylene.

CROSS-NOTATION

This is a streamlined continuation application of parent application Ser. No. 84,453, filed Oct. 27, 1970, now abandoned.

BACKGROUND OF THE INVENTION

Field of the invention

This invention relates to a process for converting olefins to aromatics by contacting the olefins at elevated temperatures with an intimate mixture of a dehydrodimerization agent such as an oxide of bismuth, lead, or antimony and an aromatization catalyst consisting of metal oxides or supported metals. A specific example is the conversion of isobutylene to para-xylene.

Prior art

Petroleum derived aromatic hydrocarbons are commonly produced by the dehydrocyclization and aromatization of $C_6$–$C_8$ rich naphthas, i.e. by catalytic reforming, followed by Udex extraction with an aqueous glycol solution to recover the aromatics from their relatively dilute solution in the non-aromatic reformate naphtha. Fractional distillation is generally employed to separate the various aromatic components which include benzene, toluene, ortho-xylene and a mixture of meta- and para-xylenes. This process gives xylenes in quantities at or near thermodynamic equilibrium quantities and thus, is non-selective. Para-xylene, for example, is separated from the meta-xylene and para-xylene either by fractional crystallization or fractional adsorption on molecular sieves.

There are a number of patents relating to the dimerization of olefins, such as U.S. 3,435,089, showing the dimerization of propylene to hexadiene-1,5 using lead oxide, and U.S. 3,494,956 showing the dimerization of isobutylene to produce 2,5-dimethylhexadiene-1,5 using lead, cadmium or thallium oxides with from 0 up to 10 percent oxygen in the feed gas. There are also literature articles, particularly of F. Massoth, showing reduction of bismuth oxide with propylene to produce 1,5-hexadiene. All of these processes can operate without the addition of air or oxygen to the feed gas.

Three U.S. Pats. 2,217,012-013-014 show the cylization-aromatization of various hexadiene compounds to produce benzene mono-alkylbenzenes, and the ortho-dialkylbenzenes. The catalysts utilized are the oxides and other compounds of such metals as titanium, zirconium, hafnium and thorium; vanadium, niobium and tantalum; and chromium, molybdenum, tungsten and uranium. The instant process by selection of the proper olefin can produce the far more desirable para-dialkylbenzenes, in particular para-xylene, almost exclusively with only extremely minor amounts of the orthoisomer or meta-isomer. On the other hand by selection of other olefins the instant process can be designed to produce the orthoisomer exclusively. The prior art processes do not have this versatility. Other patents also show the use of various metal oxide type catalysts to convert dimethylhexadiene to para-xylene, but all of these suffer from serious disadvantages, such as poor isomer purity, low yields and large amounts of undesired side reactions such as hydrogenation, polymerization and the like.

Other patents require the use of air or oxygen in conjunction with the catalyst to produce the desired aromatic compounds, thus in the prior art the conversion of olenfis to aromatics was accomplished in a two-stage operation, the first stage being the dehydrodimerization and the second stage cyclizationaromatization. These were carried out with different catalysts in different reactors.

The process of the instant invention which employs a single stage rather than a sequence of stages and employs an intimate mixture of dehydrodimerization agent and aromatization catalyst, in addition to the obvious economic advantages of a single stage, single reactor system without separation of by-products between the stages, has additional technological advantages. The present invention produces higher principal aromatic selectivity, thus, for example, isobutylene is converted to 2,5-dimethylhexadiene-1,5 which in turn is converted to paraxylene with a higher selectivity than from the sequential operation. This results in a higher yield of the principal product per pass and also a higher isomer purity with respect to its mixture with the meta-isomer.

The method of the present invention when compared with sequential operation produces smaller amounts of non-aromatic hydrocarbons, smaller amounts of other isomers and smaller amounts of dealkylated homologs of the principal aromatic product. This is accomplished with no loss in conversion of olefin and in addition, no olefin oligomers, polymers or hydrogenation products can be detected. In all of the prior art processes one or more of these undesirable side reactions is noted, with some far more frequently than others. Finally the overall loss of hydrocarbonaceous material through burning to $CO_2$ is reduced substantially by operating with the mixed agent catalyst system of the instant invention rather than with sequential reactors. Although the reasons for the greatly improved efficiency of the instant process have not been determined with exactness, it is believed that the possible explanation for this improved efficiency is that with the aromatization catalyst in colse proximity to the dehydrodimerization agent the system is stabilized rapidly before the undesired side reactions produced particularly by the dehydrodimerization agent can occur. Thus, burning, polymerization isomerization and similar undesired side reactions are substantially completely eliminated.

Although the prior art shows a two-step process for the conversion of olefins to aromatics, there is no known prior art process which converts olefins directly to aromatics at high selectivity in the absence of air or oxygen. Prior to the instant process there has been no description of a method to produce high isomer purity para-xylene from isobutylene at high yields in a single stage with direct conversion and, in general, contrary to prior art processes the instant process provides a method of making a specific aromatic or mixture of aromatics which are not at thermodynamic equilibrium.

SUMMARY OF THE INVENTION

In accordance with this invention mono-olefins having an allyl hydrogen and having at least 3 carbon atoms in the molecule are converted to aromatics by contacting them with a dehydrodimerization agent intimately admixed with an aromatization catalyst at contacting temperatures in the range of from about 400° C. to 650° C. The dehydrodimerization agents include bismuth oxide, lead oxide or antimony oxide and the aromatization catalyst can be supported plantinum, supported palladium, supported cobalt, or a metal oxide or mixtures thereof, such as chromia-alumina, cobalt molybdate, tin oxide or zinc oxide. The reaction is highly specific for the production of a particular aromatic, or mixture of aromatics from a particular olefin and thus, is suitable for the production of benzene para-xylene, ortho-xylene, para-diethylbenzene and the like with the particularly important embodiment being the production of para-xylene from isobutylene.

It is an object of this invention therefore, to provide a single step process for the direct conversion of olefins to aromatics.

It is another object of this invention to provide a method for the direct conversion of olefins to aromatics at a high selectivity for a specific aromatic or mixture of aromatics from a specific olefin.

It is another object of this invention to provide a method for the direct conversion of olefins to aromatics in the absence of a free oxygen-containing gas.

It is another object of this invention to provide a method for the direct conversion of olefins to aromatics which minimimizes undesired side reactions, in particular, burning the olefin to carbon oxides.

Other objects of this invention will be apparent from the description of the preferred embodiments which follow and from the claims.

DESCRIPTION OF THE PREFERRED EMBODIMENTS

The olefins which can be converted in accordance with this invention are the mono-olefinic hydrocarbons having an allylic hydrogen, i.e. a hydrogen on the carbon which is alpha to the double bond. The olefins which are suitable for conversion to aromatics in accordance with this invention have the general formula:

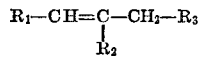

wherein $R_1$, $R_2$ and $R_3$ can be hydrogen or alkyl, aryl, aralkyl or alkaryl groups with $R_1$, $R_2$ and $R_3$ being the same or different. If the $R_1$, $R_2$ and $R_3$ are hydrogen or alkyl it is preferable that there be not more than 10 carbon atoms in the olefin molecule and when they are aryl it is preferable they be phenyl.

It is particularly preferred to employ mono-olefins having the above formula, and having from 3 to 6 carbon atoms in the molecule, and it is most preferred to employ propylene or isobutylene since benzene is produced substantially completely exclusively from propylene while para-xylene is produced from the isobutylene at a very high purity and yield.

The single reactor containing the mixed solids can be operated either up-flow or down-flow, likewise a single fluidized bed consisting of supported dehydrodimerization agent and supported aromatization catalyst can be employed. In such a system the support materials should have the effect of equalizing the densities of two components to achieve intimate mixing in the fluidized bed. Supported dehydrodimerization agent and supported aromatization catalyst for fixed bed operation is not required although it can be used. Obviously however, in the case of metallic platinum, palladium, or cobalt, supporting is preferred in order to provide better equalization of densities of the agent and catalyst and likewise a better surface area exposure for the metal. Supports which can be used include silica, magnesia, alumina and the like but all such support systems should be neutralized, for example, by treating with a 1 percent sodium hydroxide solution, rinsed and dried before final preparation for use. Such treatment is required to neutralize any acid sites on the supports since such acid sites destroy the selectivity of the process. This is an important requirement of the instant invention, that no acid sites be present either on the dehydrodimerization agent or the aromatization catalyst.

As has been pointed out the preferred compounds for the dehydrodimerization agent are bismuth oxide, lead oxide and antimony oxide with bismuth oxide and lead oxide being preferred and bismuth oxide being the most preferred since it has been found to give the highest conversions of all of the oxides tested.

The dehydrodimerization agent reacts with the allylic hydrogen on each of two molecules of the olefin thereby producing water and a di-allylic dimer of the olefin. Thus, with propylene, bismuth oxide is reduced and two molecules of propylene are dimerized to give hexadiene-1,5 together with water. Similarly, if isobutylene is utilized as the olefin there will be produced the 2,5-dimethylhexadiene-1,5 and the bismuth oxide will be reduced while water is also produced. If lead oxide and antimony oxide are employed, they likewise will be reduced giving up a portion of their combined oxygen. It is preferred to operate so that no more than 70 percent of the combined oxygen in the dehydrodimerization agent is utilized, and it is more preferred that no more than 50 percent of the combined oxygen is used. The most preferred operation is to discontinue the passage of the olefin through the reactor after about 20 percent of the combined oxygen has been used.

Following the reaction cycle the dehydrodimerization agent is treated with a free oxygen-containing gas to produce recombined oxygen with the metal. It is preferred however, to operate the regeneration cycle so that only about 95 percent of the amount of original combined oxygen is produced in the dehydrodimerization agent. If the regeneration is continued until the combined oxygen is the same as that present originally it has been found that the agent is so active that initially there will be produced undesired higher conversions to $CO_2$. Thus, the most preferred mode of operation is to operate so that the amount of combined oxygen ranges from 95 percent down to about 80 percent of that initially present in the agent.

The aromatization catalysts which can be used have been described, the most preferred being chromia-alumina, with supported cobalt molybdate and platinum or palladium on magnesia being preferred alternatives, the metal ranging from 0.1 to 5 weight percent of the supported catalyst. In all cases the catalysts which are supported on acidic surfaces or which contain acid-forming binders such as silica, must be neutralized before use as has been described.

For fixed bed operation the mixture of aromatization catalyst and dehydrodimerization agent should be in the bulk volume ratio in the range of from 1:9 to 9:1 with a preferred range being from 3:1 to 1:2 and the most preferred range being from 2:1 to 3:2 of the catalyst to agent. Since these materials are of different density, it has been found that for intimate mixing the particles should be of slightly different size in order to prevent subsequent segregation due to the inevitable shaking of the catalyst bed during use. Thus, for example, it has been found that a 10–12 mesh particle size of bismuth oxide ($Bi_2O_3$), i.e. through 10 retained on 12 U.S. standard mesh, mixes well with a 12–20 mesh particle size of chroma-alumina. This mesh size relationship will obviously differ for each agent-catalyst combination but the principle is the same. In all cases the lower density material must be of average smaller size than the higher density material to achieve an even distribution of the two species. By employing this relationship, the even distribution in the reactor bed is maintained in spite of the vibrating action which is nearly always present in an operating unit and which would cause segregation of non-size adjusted species with consequent loss of process selectivity. The particle sizes mentioned have been found suitable in the laboratory but of course, the size ranges for particles utilized in commercial reactors can be selected as a function of the reactor diameter.

Although it is preferred to employ the intimate mixing of particles in a fixed bed, alternative methods of achieving the effect of intimate mixing and distribution can be obtained by utilizing a series of trays on which both oxide and catalyst are closely associated on the same tray. This and similar methods for obtaining intimate mixing are not preferred but are mentioned to show that it is the intimate mixing effect in a single reactor that is important. Thus, the important feature which must be kept in mind is that the means employed should be designed so that the gas containing unreacted olefin and its diallyl dimerization product after contacting the dehydrodimerization agent is brought extremely rapidly into contact with the aromatization catalyst in a single reactor.

The reaction can be carried out at a temperature in the range of from 400° C. to 650° C. with a preferred range being from about 500° C. to 550° C. with a most preferred range being from 525° C. to 550° C. Pressures in pounds per square inch absolute can range from about 0 to 100 with from 15 to 45 p.s.i.a. being preferred and the most preferred being about 30 p.s.i.a. The olefin feed can either be the pure olefin or it can be admixed with an inert gas with the olefin feed concentration preferably ranging from 50 to 100 percent and most preferably 100 percent. In addition, mixtures of certain olefins can be employed, but of course, the aromatic product will also consist of a mixture. The contact time can range from 0.1 to 3 seconds with a preferred range of from 0.25 to 1.5 seconds and a most preferred range of from 0.5 to 0.9 seconds based on the total solids, i.e. dimerization agent plus aromatization catalyst and a 1 to 1 agent bulk volume to catalyst bulk volume ratio. Other volume ratios would require changing the contact time to compensate for the smaller amount or larger amount of dehydrodimerization agent present.

As has been pointed out it is necessary to regenerate the dehydrodimerization agent since it enters into the reaction and the oxide is reduced by loss of combined oxygen to the reaction. This is accomplished by first stopping the flow of olefin after the desired amount of combined oxygen has been utilized, purging the bed with an inert gas such as nitrogen, argon, flue gas, steam or the like, then introducing a free oxygen-containing gas which may be either pure oxygen or oxygen diluted with an inert gas, with air being the most preferred agent. The regeneration is continued until about 95 weight percent of the original amount of combined oxygen in the dehydrodimerization has been restored to the agent, at the same time any coke which may have been laid down on the aromatization catalyst will be burned off. The oxygen is then purged from the bed with an inert gas in the same manner as at the start of the regeneration cycle and thereafter the olefin introduction is resumed.

The following examples are provided solely for the purpose of further illustrating and describing the invention.

EXAMPLE I

Bismuth oxide granules were made by slurrying $Bi_2O_3$ powder in 100 percent nitric acid, filtering, drying, calcining, breaking the filter cake and sieving into through 10 on 12 mesh granules. Crushed, neutral commercial chromia-alumina particles were sieved to obtain through 12 on 20 mesh granules. Equal bulk volumes of the two types of particles were intimately mixed and 25 cc. of the mixture (39.6 gms. of the $Bi_2O_3$ and 10.9 gms. of chromia-alumina particles) was supported in an electrically heated, tubular glass reactor. A flow of 600 cc./min. of isobutylene was passed over the bed of mixed granules maintained at 550° C., corresponding to an average residence time of 0.5 seconds. The flow was maintained for 4 minutes, during which time about 10 percent of the oxygen in the metal oxide was consumed. Samples of this product were taken at 2 and 4 minutes of reaction time and analyzed by gas chromatographic techniques. The reactor was then quickly flushed with argon, regenerated with air, flushed again with argon and reacted with isobutylene in the next cycle. In a typical run 14 weight percent of the isobutylene fed to the reactor was converted to product, 78 weight percent of which was aromatic products or aromatic precursors (2,5-dimethyl hexadiene-1,5, and 2,5-dimethyl hexadiene-2,4). From 60–62 weight percent of the product was para-xylene at a purity of 96–96.5 weight percent in the para-meta isomer mixture. Recycle of the dienes improves the para-xylene yield to 71 weight percent of the product.

EXAMPLE II

Lead oxide granules were made by slurrying litharge powder in water, filtering, drying, calcining, breaking the filter cake and sieving into through 10 on 12 mesh granules. These were mixed with an equal volume of chromia-alumina granules, like those of Example I, and 25 cc. of the mixture (30.1 grams of lead oxide granules, 10 x 12 mesh, and 10.9 grams of 12 x 20 mesh chromia-alumina granules) was charged to the reactor of Example I. A flow of 200 cc./min. of isobutylene was passed through the reactor at 550° C., corresponding to an average residence time of 1.4 seconds. The conversion of isobutylene to products was 10.4 weight percent of which 68 weight percent comprised aromatics and aromatic precursors. Para-xylene formed 59 weight per cent of the product and was at least 96 weight percent pure, the resolution in the gas chromatograph being insufficient to completely separate the small amount of meta-xylene in this case.

EXAMPLE III

When a flow of 300 cc./min. of propylene is passed over the bed of mixed granules of Example I, maintained at 550° C., corresponding to an average residence time of 0.9 seconds, the conversion of propylene to products is 15 weight percent. This product consists of 87 weight percent aromatics or aromatic precursors (hexadiene-1,5). Benzene forms 80 weight percent of the total product.

EXAMPLE IV

When a flow of 400 cc./min. of a mixture of propylene and isobutylene, at a molar ratio of 2.5 to 1, is passed over the bed of mixed granules of Example I, maintained at 550° C., corresponding to an average residence time of 0.7 seconds, the conversion of the propylene-isobutylene mixture is 20 weight percent. Of this product, 80 weight percent consists of aromatics or aromatic precursors (hexadiene-1,5, 2-methyl hexadiene-1,5 and 2,5-dimethyl hexadienes). The aromatics portion forms 80 weight percent of the total product, with benzene accounting for 20 weight percent, toluene 36 weight percent, and para-xylene for 20 weight percent of the product. The purity of para-exylene in the para-meta isomer mixture is 95 weight percent.

EXAMPLE V

Magnesium oxide granules (12 x 20 mesh) were made by slurrying reagent grade magnesium oxide powder in water and then treating in the same manner as bismuth oxide in Example I. Bismuth oxide granules were mixed with an equal bulk volume of the magnesium oxide granules, and 25 cc. of the mixture (40.0 gms. of $Bi_2O_3$ and 7.8 gms. of MgO particles) was used in the reactor of Example I. When a flow of 600 cc./min. of isobutylene is passed over the mixed bed of granules maintained at 550° C., corresponding to an average residence time of 0.5 seconds, the conversion of isobutylene to product is 11 weight percent. Of the product, 70 weight percent consists of aromatics or aromatic precursors. Para-xylene forms 53 weight percent of the product and has a purity in its mixture with the meta isomer of 95 weight percent.

EXAMPLE XI

When alpha-methyl styrene is treated as in Example VII, para-terphenyl can be identified in the product.

EXAMPLE XII

When either beta-methyl styrene or allyl benzene is treated as in Example VII, ortho-terphenyl along with some triphenylene and para-terphenyl can be identified in the product.

EXAMPLE XIII

Comparative runs were carried out using the single reactor system of Examples I and II and a sequential operation wherein the bismuth oxide was in the first reactor and the chroma-alumina in the second reactor. The feed was isobutylene and the conversion was to para-xylene. The conditions and results are shown in the Table.

TABLE

| Mode of operation | React. temp., °C. | Contact time, sec. | Isobutylene conv., wt. percent | Aromatics and dienes selectivity, percent | Para-xylene select., wt. percent | Para-xylene isomer purity, wt. percent |
|---|---|---|---|---|---|---|
| Sequential $Bi_2O_3$ in 1st reactor | 550 | 0.34 | 14 | 71.7 | 52.2 | 90 |
| $Cr_2O_3/Al_2O_3$ in 2nd reactor | 550 | 0.25 | | | | |
| Single reactor mixed $Bi_2O_3$ and $Cr_2O_3/Al_2O_3$ | 550 | 0.46 | 14 | 78 | 61.4 | 98 |
| Single reactor mixed PbO and $Cr_2O_3/Al_2O_3$ | 550 | 1.4 | 10.4 | 68 | 59 | 98 |

EXAMPLE VI

Tetra-amino platinic hydroxide solution was impregnated on the magnesium oxide granules of Example V, drained, dried and calcined to leave a deposit 1 percent platinum. Bismuth oxide granules were mixed with an equal bulk volume of the platinum on magnesium oxide granules, and 25 cc. of the mixture (39.7 gms., of $Bi_2O_3$ and 8.0 gms. of platinum on magnesium oxide particles) was used in the reactor of Example I. When a flow of 600 cc./min. of isobutylene is passed over the mixed bed of granules maintained at 550° C., corresponding to an average residence time of 0.5 seconds, the conversion of isobutylene to products is 13 weight percent. Of the product, 72 weight percent consists of aromatics or aromatic precursors. Para-xylene forms 56 weight percent of the product and has a purity of 96 weight percent in its mixture with the meta isomer.

EXAMPLE VII

Cis butene-2 was passed into the reactor of Example I, using the mixture of granules and the reaction conditions described therein. At a conversion of about 5 weight percent of the olefin feed, 20 weight percent of the product consisted of aromatic hydrocarbons, in the weight ratio of approximately 1:1.25:2 of para-xylene to ethyl benzene to ortho-xylene. Of the products, 50 weight percent were these aromatics' precursor dienes.

EXAMPLE VIII

Trans-butene-2, treated as in Example VII, produced the same conversions and product distribution.

EXAMPLE IX

Butene-1, treated as in Example VII, produced the same conversions and product distribution.

EXAMPLE X

When either 3-methyl butene-1, 2-methyl butene-2 or 2-methyl butene-1 is treated as in Example VII, para-diethyl benzene, meta and para methyl isopropyl benzene, prehnitene, durene, and 1,2-dimethyl-4-ethyl benzene can be identified in the product.

If the unconverted dimethylhexadienes are recycled the para-xylene selectivities in each case are increased, respectively, to 61.7 for sequential, 75 for mixed $Bi_2O_3$ and $Cr_2O_3/Al_2O_3$ and 66 for mixed PbO and $$Cr_2O_3/Al_2O_3.$$

The foregoing examples demonstrate the use of various olefin feed and agent-catalyst combinations using the single reactor mixed agent-catalyst of the instant invention. Example XIII shows the marked improvements in aromatic and diene selectivity, in the desired aromatic selectivity (para-xylene) and, most importantly, in the high isomer purity of the desired aromatic, para-xylene.

We claim:
1. In the method of preparing aromatic hydrocarbons by the passage of a stream of feedstock vapor containing principal amounts of

$$R_1-CH=C-CH_2-R_3$$
$$|$$
$$R_2$$

wherein $R_1$, $R_2$, and $R_3$ are selected from hydrogen and lower alykyl groups, such olefins containing from 3 to 6 carbon atoms through a catalytic zone containing a mixture of particles of two different catalysts at a temperature within a range of from 400° C. to 650° C., whereby the olefins are dehydrodimerized and aromatized, the improvement which consists essentially of:
employing a controlling volume of particles containing $Bi_2O_3$ as the first of said two catalysts;
employing as the second of said two catalysts, particles consisting predominantly of sorptive alumina and a minor amount of chromia and said chromia sorptive alumina being sufficiently alkalized to have no acid sites, and the volume of chromia on alumina particles being about the same as the volume of $Bi_2O_3$ containing particles;
regenerating the catalyst bed to reoxidize the bismuth oxide to $Bi_2O_3$ after about 20 percent of the combined oxygen has been used, such regeneration being controlled so that only about 95 percent of the amount of original combined oxygen is produced in the particles containing $Bi_2O_3$.

2. The method according to claim 1, wherein the olefin is isobutylene, the dehydrodimerization agent is bismuth oxide and the contacting temperature is from 500° C. to 550° C.

References Cited

UNITED STATES PATENTS

| | | | |
|---|---|---|---|
| 3,644,551 | 2/1972 | Ondrey et al. | 260—673 |
| 3,644,550 | 2/1972 | Beuther et al. | 260—673 |
| 3,631,216 | 12/1971 | Lipsig | 260—673 |
| 3,769,237 | 10/1973 | Ondrey et al. | 252—464 |

DELBERT E. GANTZ, Primary Examiner

J. M. NELSON, Assistant Examiner

U.S. Cl. X.R.

252—411; 260—680 R

UNITED STATES PATENT OFFICE
CERTIFICATE OF CORRECTION

Patent No. 3,830,866          Dated August 20, 1974

Inventor(s) A. F. D'Alessandro and M. M. Mitchell, Jr.

It is certified that error appears in the above-identified patent and that said Letters Patent are hereby corrected as shown below:

Claim 1, line 7, "alykyl" should read -- alkyl --.

Claim 1, line 13, "controlling" should read -- controlled --.

Signed and sealed this 19th day of November 1974.

(SEAL)
Attest:

McCOY M. GIBSON JR.
Attesting Officer

C. MARSHALL DANN
Commissioner of Patents